Aug. 26, 1958    J. R. FULLERTON ET AL    2,849,591
METHOD OF MANUFACTURING LIGHTWEIGHT METAL
CELLULAR CORE PANELS
Filed March 29, 1956
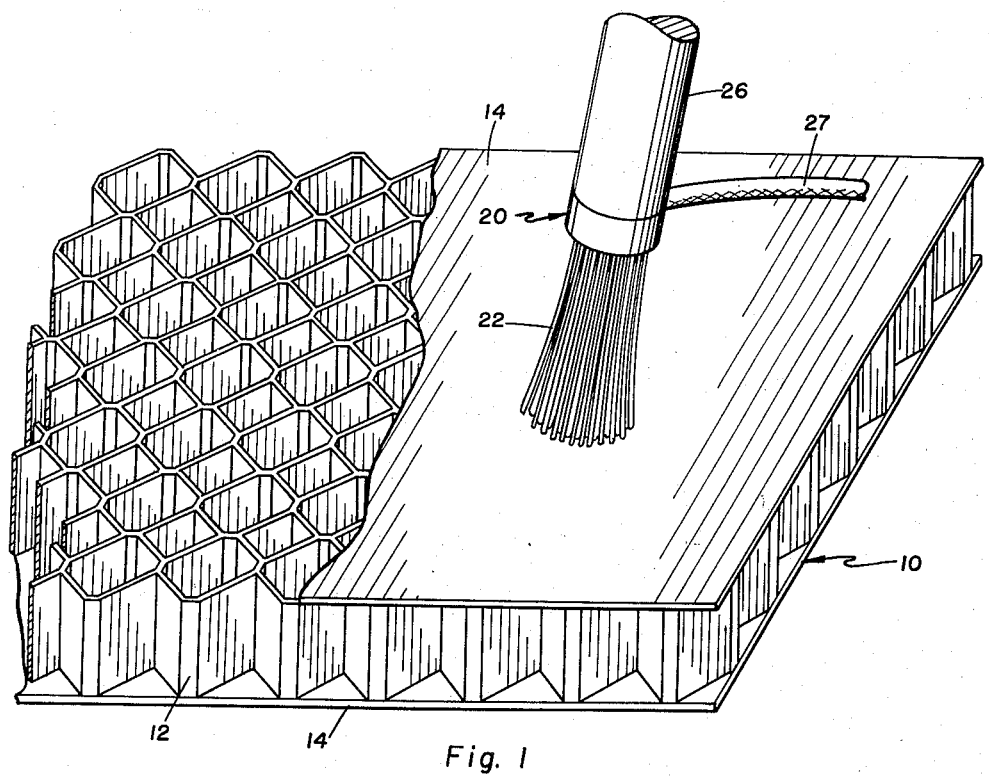
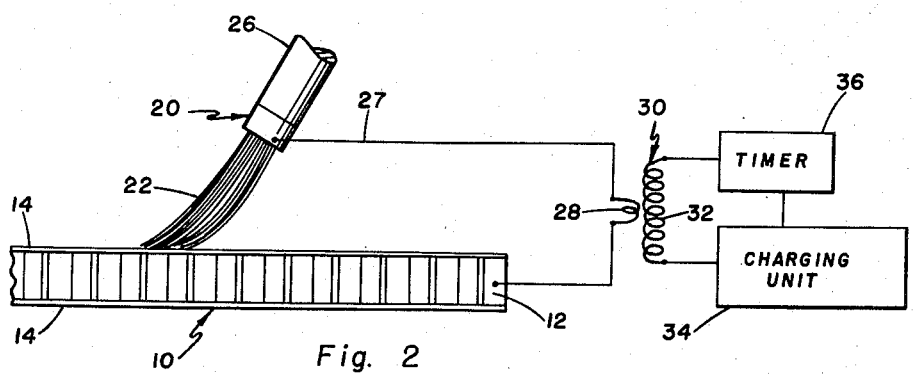
INVENTORS.
JOHN R. FULLERTON
LAWRENCE E. LEECH
DONALD L. HEYSER
BY
*Knox & Knox*

2,849,591

METHOD OF MANUFACTURING LIGHTWEIGHT METAL CELLULAR CORE PANELS

John R. Fullerton, Lawrence E. Leech, and Donald L. Heyser, San Diego, Calif., assignors to The Ryan Aeronautical Co., San Diego, Calif., a corporation of California Application March 29, 1956, Serial No. 574,681

4 Claims. (Cl. 219—107)

The present invention relates generally to prefabricated cellular core panels and more particularly to a method of manufacturing lightweight metal cellular core panels.

The primary object of this invention is to provide a method of manufacturing a cellular core panel of thin metal by welding the outer skins to the core in such a manner that burning and distortion of the skins and core are virtually eliminated.

Another object of this invention is to provide a method of manufacture in which an electrically conductive brush is used as a welding electrode to distribute the welding current to a large number of small area contacts, so that unnecessary concentration of heat is prevented.

Another object of this invention is to provide a method of manufacture in which the welding current is applied to the brush electrode in the form of short pulses each of only a few milliseconds duration.

Finally, it is an object to provide a method of manufacture of the aforementioned character which is simple, safe and convenient to use and which will produce accurate and durable welded structures.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1 is a cutaway perspective view of a cellular core panel showing the type of structure and the application of the brush electrode.

Figure 2 is a diagrammatic view showing the brush electrode and welding apparatus connected to the panel.

Similar characters of reference indicate similar or identical elements and portions throughout the specification and throughout the views of the drawing.

Referring now to the drawing in detail, the panel 10 comprises a cellular core 12, of any desired honeycomb type design, having thin skins 14 welded on each side thereof. The structure of such a panel is well known in the art and these panels may be made in various shapes, either flat or curved, according to requirements, the completed panel having a very high strength/weight ratio.

When such panels are made from thin sheet metal, particularly for use in aircraft where weight is critical, normal welding methods often cause burning and distortion of the skins and core, since the high heat necessary to produce an effective weld can not dissipate quickly enough. The most common welding apparatus used in the manufacture of these panels utilizes electrically conductive rollers which are passed over the skins 14 and press the skins onto the core 12 as welding current is applied. Although the rollers theoretically have a minimum contact area, a large heat concentration is actually built up along the line of contact. Furthermore, rollers are not readily adaptable to handling both flat and curved panels.

The instant method of welding the panel 10 utilizes an electrode 20 which comprises a bundle of thin flexible wires or bristles 22 suitably secured together at one end to form a brush. The electrode 20 may be attached to a handle 26 for manual use as shown, or may be designed for mounting in a welding machine having a power driven electrode carrier.

In use, the electrode 20 is suitably connected by a conductor 27 to one side of the secondary winding 28 of a transformer 30, the other side of said winding being connected to the core 12. The primary winding 32 of the transformer 30 is coupled to a charging unit 34 containing a rectifier and condensers, the circuitry being designed to supply low voltage, high amperage current in pulses of short duration by discharge of the condensers through the transformer 30. Such apparatus is well known, but the duration of each pulse is often a substantial fraction of a second. The instant method of welding is most effective when the welding current impulses are on the order of a few milliseconds, and the transformer 30 and charging unit 34 are designed accordingly. The pulses of current are controlled by an electronic timer 36 or an equivalent device.

The brush electrode 20 is drawn across each skin 14 while the skin is held tightly against the core 12. Any convenient clamps or other retaining devices may be used to hold the skins in place and ensure complete contact between skins and core. A reasonable amount of pressure is applied to the electrode 20 so that all the wires 22 are in contact with the skin 14 to prevent arcing. Also, the pressure applied to the electrode helps to hold the skin in firm contact with the core at the actual point of weld. The current is thus distributed to a large number of contact points each of small area, and the short pulses of current prevent any build-up of heat or burning of the wires 22. It has been found that the brush type electrode distributes sufficient heat for an effective weld without overheating the thin materials of the core 12 and skins 14, thus producing a firmly bonded, distortion free panel of high standard. For maximum efficiency the electrode 20 is moved over the skins in a predetermined pattern, such as in straight parallel strokes, to ensure overall coverage and complete welding of skins to core. The brush electrode may also be used to weld edge filling strips to the edges of a panel between the skins to make a completely enclosed panel.

It should be understood that the electrode 20 is not merely a frictional contact type conductor for conducting current to a moving work piece, as in some types of tube seam welding machines, but is actually a welding electrode. The word brush has been used in this disclosure even though the term has been previously employed generally to indicate various types of electrical contacts for conducting current to a moving surface, such as the carbon brushes in an electric motor. The size of the electrode 20 and the number and diameter of the wires 22 are, of course, determined by the particular work to be welded. The brush electrode is not necessarily limited to the welding of cellular core panels, but is equally suitable for other work where burning and distortion must be kept to a minimum, the flexible wires 22 enabling the electrode to follow intricate curves and shapes in the work.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

We claim:

1. A method of manufacturing lightweight metal cellular core panels, comprising: connecting a metallic cellular core to one output connection of a resistance welding apparatus; placing a thin metallic skin in contact with one surface of the core; connecting a flexible, multiple bristle, brush type electrode to the other output connection of the apparatus; and applying short pulses of welding current to the brush electrode, while moving the electrode over the skin in firm frictional contact therewith to cover substantially the entire surface area of the skin with the complete pressure exerted by said firm frictional contact localized to that small portion of the skin immediately contacted by the brush electrode, whereby said small portion of the thin metallic skin is locally deflected into contact with the adjacent portion of said one surface of the core and thus accommodating for minor variations from accurately flat configuration of said one surface.

2. A method of manufacturing lightweight metal cellular core panels, comprising: connecting a metallic cellular core to one output connection of a resistance welding apparatus; placing a thin metallic skin in contact with one surface of the core; connecting a flexible, multiple bristle, brush type electrode to the other output connection of the apparatus; and applying consecutive pulses of welding current, each of a duration on the order of a few milliseconds, to the brush electrode, while moving the electrode over the skin in firm frictional contact therewith according to a predetermined pattern and in parallel strokes to cover substantially the entire surface area of the skin.

3. A method of manufacturing lightweight metal cellular core panels, comprising: connecting a metallic cellular core to one output connection of a resistance welding apparatus; placing a thin metallic skin in contact with one surface of the core; clamping the skin in general overall contact with the core; connecting a flexible, multiple bristle, brush type electrode to the other output connection of the apparatus; and applying consecutive pulses of welding current, each of a duration on the order of a few milliseconds, to the brush electrode, while moving the electrode over the skin in firm frictional contact therewith according to a predetermined pattern and in parallel strokes to cover substantially the entire surface area of the skin.

4. A method of manufacturing lightweight metal cellular core panels, comprising: connecting a metallic cellular core to one output connection of a resistance welding apparatus; placing a thin metallic skin in contact with one surface of the core; clamping the skin in complete overall contact with the core; connecting a flexible, multiple bristle, brush type electrode to the other output connection of the apparatus; and applying consecutive pulses of welding current, each of a duration on the order of a few milliseconds, to the brush electrode; and moving the electrode over the surface area of the skin to be welded while applying sufficient pressure to the electrode to hold the skin firmly against the core immediately adjacent the brush electrode.

References Cited in the file of this patent

UNITED STATES PATENTS

| | | |
|---|---|---|
| 1,052,753 | Rietzel | Feb. 11, 1913 |
| 2,056,563 | Budd et al. | Oct. 6, 1936 |
| 2,108,795 | Budd | Feb. 22, 1938 |
| 2,365,539 | Flowers | Dec. 19, 1944 |